Figure 1:
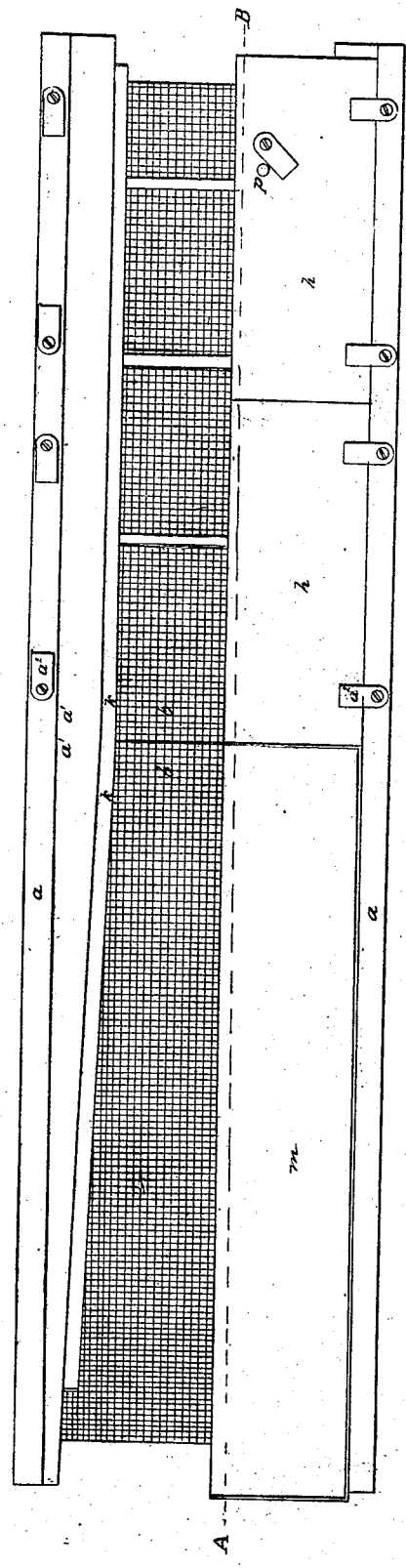

J. Hayden.
Cotton Picker.

N° 16,833.

Patented Mar. 17, 1857.

UNITED STATES PATENT OFFICE.

ISAAC HAYDEN, OF LAWRENCE, MASSACHUSETTS.

MACHINERY FOR CLEANING AND SEPARATING COTTON, WOOL, FUR, AND OTHER FIBROUS MATERIALS.

Specification of Letters Patent No. 16,833, dated March 17, 1857.

*To all whom it may concern:*

Be it known that I, ISAAC HAYDEN, of Lawrence, in the county of Essex and State of Massachusetts, have invented a new and useful Apparatus to be Applied to Machines for Cleaning and Separating Wool, Cotton, Fur, and other Fibrous Substances; and I do hereby declare that the same is described and represented in the following specification and drawings.

To enable others skilled in the art to make and use my invention I will proceed to describe its construction, use, and operation, referring to the drawings in which the same letters indicate like parts in each of the figures.

Figure 2:
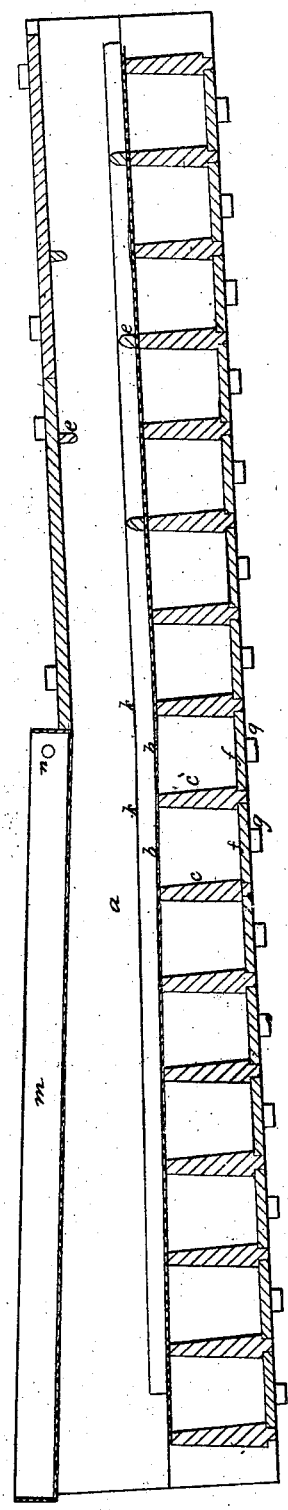

Figure 1, is a plan of my invention with one half of the top removed to show the screen. Fig. 2, is a sectional elevation representing Fig. 1, cut through the line A, B.

The design and object of my apparatus when applied to machines for cleaning cotton and other fibrous substances, is, to make the machine clean the cotton more perfectly by blowing or drawing it when separated into very small flakes, or loose open locks, through a long trunk provided with numerous cross partitions on its bottom; these partitions and the spaces between them, being covered with a woven wire screen or net, with open meshes large enough to allow the blast of air blown through the trunk to circulate freely through them; but so small that only the short fibers of cotton will be blown through, while the dirt, dust, sand and other refuse matter mixed with the cotton, which are heavier than the cotton, will fall through the meshes in the woven wire screen, and remain between the partitions until they are removed, while the cotton is blown through the trunk over the screen, after precipitating all extraneous matter which was mixed with it; through the screen, it passes out of the trunk into the receptacle or devices prepared to receive it; being far better cleaned than it has ever been done before by any machine heretofore known.

The area of the trunk above the screen may be increased by making it large toward its rear, and, by gradually increasing its height, or width, or both, so that the blast of air which conveys the materials through the trunk, will move gradually slower, so as to allow the light and fine, or such portions of the materials as are intended to be separated, time to be precipitated, and fall through the screen before the current of air which holds them in suspension escapes from or passes out of the trunk, some portion of the trunk may be covered with sheet metal or other baths, supplied with cold water so as to cool the upper stratum of air, to make it heavier, and induce it to descend into the lower part of the trunk, between the partitions where there will be less motion than above the screen, so as to precipitate or allow the substances held in suspension time to fall and deposit themselves in the spaces under the screen.

The partitions in the trunk may be made wider, so as to make the spaces between them gradually deeper toward the rear end of the trunk, so that there will be less motion under the screen at that end, so as to allow the finer or finest portions of the materials held in suspension time to precipitate and deposit themselves.

In order to prevent the fibers of cotton or other substances blown through the trunk from catching and hanging in the scores in the wove-wire screen, formed by the weft in crossing the warp, or at the junction of the warp and weft, I fill these scores with melted metal, varnish, or some kind of cement: so as to allow the fibers of the substance cleaned, or operated upon, to pass freely over the screen, and save them from being caught in the scores, as they would most certainly be, if the scores were not filled with same material to prevent them.

In the above mentioned drawings $a$, $a$, are the sides of a long trunk, connected together by a series of cross partitions $c$, $c$, about one half the width of the sides, placed about six inches apart, with their lower edges even with the lower edges of the sides as represented in Fig. 2. There is a rabbet $a'$, $a'$, on the inside of both edges of the sides $a$, $a$, to which the top and bottom of the trunk is fitted, the bottom pieces $f$, $f$, are made just wide enough to fill the spaces between the partitions $c$, $c$ as represented in Fig. 2, and are secured in their places by the bottoms $g$, $g$, fastened to the sides $a$, $a$. The top $h$, $h$, may be made in sections and fitted to the rabbets $d'$, $d'$, and fastened down by the buttons $a^2$, $a^2$, which are fastened to the sides as represented.

The wove wire screen $b$, $b$, is made of wire about number twenty two, woven so that the center of the wires are about one eighth of an inch apart in each direction; and to prevent the fibers of cotton or other substances from catching and hanging in the scores in the wove wire formed by the weft crossing the warp, or at the junction of the warp and weft, I fill them with melted metal by dipping the wove wire into melted metal either tin or a composition of tin and lead, or instead of dipping the wove-wire into molten metal, it may be covered with a varnish, made by dissolving gum-shellac in alcohol and applying it with a brush upon one or both sides; if only one side the top should be varnished and the wire placed in a horizontal position when it is varnished, and allowed to remain in that position until it is dry, it should be brushed crosswise in applying the first coat of varnish, and when that is dry the second coat should be applied by brushing it lengthwise, so as to fill the scores in each direction.

Instead of the varnish or melted metal mentioned, any other kind of varnish, or cement which will answer the purpose may be used to fill the scores, or instead of the wove wire, a screen made of twine might be prepared with varnish so as to answer the purpose if for any cause it should be preferred. This screen of wove wire is fastened to the tops of the partitions $c$, $c$, so as to entirely cover the space between the sides $a$, $a$, and some smooth cleats $k$, $k$, should be fastened to the sides over the screen to fill the corners formed by the screen and the sides $a$, $a$, so as to prevent the fibers from catching and hanging in the corners.

If it is found necessary or desirable, some deflecting cleats $e$, $e$, may be fastened on the top of the screen, and on the under side of the top of the trunk, as represented at Fig. 2, to deflect the blast as it passes through the trunk. The rear end or part of the trunk is made wider and higher as represented in the drawings, so as to increase its area, and reduce the blast by allowing it to expand, so that it will move slower, and allow the light and fine or such portions of the materials as are intended to be separated, time to be precipitated, and pass through the screen before the air which holds them in suspension passes out of the trunk. The partitions $c$, $c$, are made wider toward the rear end of the trunk so as to make the spaces between them deeper, so that there will be less motion to the air under the screen where they are deeper to allow the substances in suspension time to precipitate and deposit themselves between the partitions.

The curved form of the wire in the screen presents a very different surface to the flowing current of air from that presented by perforated sheet metal; besides there is far more open space in a given area, than if perforated metal or other substances were used affording greater facility for the sand, dirt or other substances intended to be separated to pass through the screen.

In cleaning cotton the fiber which is long enough to reach across more than two spaces or meshes in the screen is carried forward over it; but that which is shorter than two meshes is carried through the screen and deposited in the spaces between the partitions. This apparatus separates the dust from the cotton so perfectly and completely, that there is far less dust evolved from it, (the cotton,) in passing it through the subsequent processes of manufacture. Besides the goods manufactured from cotton cleaned in this apparatus present an appearance so much superior to others, as to increase their market value from five to eight per cent. and at the same time the cotton is worked with far less loss in waste than heretofore; so that it enables the manufacturer to make goods of a given quality out of a far cheaper and inferior quality of raw material than he could do without it. And in addition to the advantages already enumerated, the cards working cotton cleaned in this apparatus, will not require more than two thirds as much grinding as others; so that one third of the labor and expense of grinding the cards is saved, and one third or more of the wear and tear of the card clothing also.

I contemplate that this apparatus may be used in working wool and in separating the hair from the fur for making hats, by graduating the blast, so as to allow the hair to fall through the screen while the fine fur would be carried over it. And it is believed it can also be used to great advantage in machines for cleaning and dressing feathers, hair and other fibrous substances.

In using this apparatus it is intended to apply it to such machines for beating, picking, scutching and opening cotton, wool, fur and other fibrous substances as can be made to produce either a blast or suction with or without the aid of a fan to assist in passing the substances to be operated upon through the machine or apparatus.

The wire used for making the screen and the meshes formed in it may be made of such dimensions as will adapt it to the purposes for which it is intended to be used. And the trunk may be made air tight or as nearly so as may be necessary for the purpose for which it is to be used.

I believe my invention may be advantageously used in the manufacture of lampblack, zinc white and in collecting the products of sublimation of some other substances.

I believe I have described the construction, operation and use of the apparatus which I have invented so as to enable any person skilled in the art to make and use the same; also some of the several uses to which it may be applied. I will now specify what I desire to secure by Letters Patent.

I claim—

1. Increasing the area of the trunk above the screen or making it larger toward its rear end by increasing its height, or width, or both as may be desirable, so that the blast of air which conveys the materials into, or through the trunk, will move gradually slower, so as to allow the light, and fine, or such portions as are intended to be separated, time to be precipitated, and pass through the screen before the air which holds them in suspension escapes from, or passes out of the trunk.

2. And in combination with a trunk made gradually larger toward its rear end as above claimed, I claim a screen of woven wire or twine arranged upon a series of partitions substantially as described for the purposes set forth.

ISAAC HAYDEN.

Witnesses:
JOHN S. HOLLINGSHEAD,
SAML. GRUBB.